United States Patent
Basso et al.

(10) Patent No.: US 7,474,662 B2
(45) Date of Patent: *Jan. 6, 2009

(54) SYSTEMS AND METHODS FOR RATE-LIMITED WEIGHTED BEST EFFORT SCHEDULING

(75) Inventors: Claude Basso, Raleigh, NC (US); Jean Louis Calvignac, Raleigh, NC (US); Chih-jen Chang, Apex, NC (US); Natarajan Vaidhyanathan, Carrboro, NC (US); Fabrice Jean Verplanken, LaGaude (FR)

(73) Assignee: International Business Machines Corporation, Armonk, NY (US)

( * ) Notice: Subject to any disclaimer, the term of this patent is extended or adjusted under 35 U.S.C. 154(b) by 638 days.

This patent is subject to a terminal disclaimer.

(21) Appl. No.: 11/119,329

(22) Filed: Apr. 29, 2005

(65) Prior Publication Data

US 2006/0245443 A1 Nov. 2, 2006

(51) Int. Cl.
*H04L 12/56* (2006.01)
(52) U.S. Cl. .................. 370/395.41; 370/395.42; 370/412
(58) Field of Classification Search .................. None
See application file for complete search history.

(56) References Cited

U.S. PATENT DOCUMENTS 5,675,576 A 10/1997 Kalampoukas et al.
5,940,372 A 8/1999 Bertin et al.

(Continued)

FOREIGN PATENT DOCUMENTS

DE 19620428 A1 11/1997

(Continued)

OTHER PUBLICATIONS

Yuhua Chen, et al., "Design of a Weighted Fair Queueing Cell Scheduler for ATM Netowrks," IEEE Globecom, 1998, pp. 405-410.

(Continued)

*Primary Examiner*—Chau Nguyen
*Assistant Examiner*—Louis Bell
(74) *Attorney, Agent, or Firm*—Joscelyn G. Cockburn; Schubert Osterrieder & Nickelson PLLC

(57) ABSTRACT

Systems and methods for scheduling data packets in a network processor are disclosed. Embodiments provide a network processor that comprises a best-effort scheduler with a minimal calendar structure for addressing schedule control blocks. In one embodiment, a four-entry calendar structure provides for rate-limited weighted best effort scheduling. Each of a plurality of different flows has associated schedule control blocks. Schedule control blocks are stored as linked lists in a last-in-first-out buffer. Each calendar entry is associated with a different linked list by storing in the calendar entry the address of the first-out schedule control block in the linked list. Each schedule control block has a counter and is assigned a rate limit according to the bandwidth priority of the flow to which the corresponding packet belongs. Each time a schedule control block is accessed from a last-in-first-out buffer storing the linked list, the scheduler generates a scheduling event and the counter of the schedule control block is incremented. When an incremented counter of a schedule control block equals its rate limit, the schedule control block is temporarily removed from further scheduling until a time interval concludes.

20 Claims, 8 Drawing Sheets

U.S. PATENT DOCUMENTS

| | | |
|---|---|---|
| 6,490,629 B1 | 12/2002 | Milliken et al. |
| 6,538,989 B1 | 3/2003 | Carter et al. |
| 2002/0122386 A1* | 9/2002 | Calvignac et al. ........... 370/230 |
| 2002/0141256 A1* | 10/2002 | Barri et al. .................. 365/200 |
| 2002/0154634 A1* | 10/2002 | Basso et al. ................ 370/390 |
| 2003/0154328 A1* | 8/2003 | Henderson et al. ............. 710/1 |
| 2003/0223366 A1 | 12/2003 | Jeffries et al. |
| 2003/0223368 A1 | 12/2003 | Allen, Jr. et al. |
| 2004/0088711 A1* | 5/2004 | Alverson et al. ............ 718/107 |
| 2006/0233177 A1* | 10/2006 | Basso et al. .............. 370/395.4 |

FOREIGN PATENT DOCUMENTS

| | | |
|---|---|---|
| DE | 19630919 A1 | 2/1999 |
| JP | 11261634 A | 9/1999 |
| WO | WO 01/03400 A2 | 1/2001 |
| WO | WO 01/28169 A1 | 4/2001 |
| WO | WO 01/69852 A2 | 9/2001 |
| WO | WO 02/45013 A2 | 6/2002 |

OTHER PUBLICATIONS

A. Cretegny, et al., "Flow Control for Broadband Networks Control Operations," IBM Technical Disclosure Bulletin, vol. 41, No. 01, Jan. 1998, pp. 215-220.

* cited by examiner

SYSTEMS AND METHODS FOR RATE-LIMITED WEIGHTED BEST EFFORT SCHEDULING

FIELD

The present invention is in the field of digital processing. More particularly, the invention is in the field of allocating bandwidth in a network processor.

BACKGROUND

Many different types of computing systems have attained widespread use around the world. These computing systems include personal computers, servers, mainframes and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, accounting, e-mail, voice over Internet protocol telecommunications, and facsimile.

In today's networked world, bandwidth is a critical resource. Very high network traffic, driven by the Internet and other emerging applications, is straining the capacity of network infrastructures. To keep pace, organizations are looking for better ways to support and manage traffic growth and the convergence of voice with data. Today's dramatic increase in network traffic can be attributed to the popularity of the Internet, a growing need for remote access to information, and emerging applications. The Internet alone, with its explosive growth in e-commerce, has placed a sometimes insupportable load on network backbones. The growing demands of remote access applications, including e-mail, database access, and file transfer, are further straining networks.

Eliminating network bottlenecks continues to be a top priority for service providers. Routers are often the source of these bottlenecks. However, network congestion in general is often misdiagnosed as a bandwidth problem and is addressed by seeking higher-bandwidth solutions. Today, manufacturers are recognizing this difficulty. They are turning to network processor technologies to manage bandwidth resources more efficiently and to provide the advanced data services, at wire speed, that are commonly found in routers and network application servers. These services include load balancing, QoS, gateways, fire walls, security, and web caching.

A Network Processor (NP) may be defined as a programmable communications integrated circuit capable of performing one or more of the following functions:

Packet classification—identifying a packet based on known characteristics, such as address or protocol Packet modification—modifying the packet to comply with IP, ATM, or other protocols (for example, updating the time-to-live field in the header for IP)

Queue/policy management—reflects the design strategy for packet queuing, de-queuing, and scheduling of packets for specific applications Packet forwarding—transmission and receipt of data over the switch fabric and forwarding or routing the packet to the appropriate address Although this definition accurately describes the basic features of early NPs, the full potential capabilities and benefits of NPs are yet to be realized. Network processors can increase bandwidth and solve latency problems in a broad range of applications by allowing networking tasks previously handled in software to be executed in hardware. In addition, NPs can provide speed improvements through certain architectures, such as parallel distributed processing and pipeline processing designs. These capabilities can enable efficient search engines, increase throughput, and provide rapid execution of complex tasks.

Network processors are expected to become the fundamental network building block for networks in the same fashion that CPUs are for PCs. Typical capabilities offered by an NP are real-time processing, security, store and forward, switch fabric, and IP packet handling and learning capabilities. The processor-model NP incorporates multiple general purpose processors and specialized logic. Suppliers are turning to this design to provide scalable, flexible solutions that can accommodate change in a timely and cost-effective fashion. A processor-model NP allows distributed processing at lower levels of integration, providing higher throughput, flexibility and control. Programmability can enable easy migration to new protocols and technologies, without requiring new ASIC designs.

A network processor comprises circuitry to schedule transmission of packets. Packets are scheduled for transmission according to the bandwidth allocated to each flow of packets. Multiple flows of packets may be destined for the same port or channel. The channel or port is band limited. For example, a 10 Ghz Sonet link may time-division multiplex 192 channels at about 51.84 Mega-bits per second (Mb/s). Each channel can be further multiplexed into 32 T1/E1 sub-channels. Thus, the link provides 192×32>6000 channels. Each flow destined for a channel must share it with other flows destined for the same channel. A best-effort scheduler schedules data packets for transmission according to a priority assigned to the flow queue to which each packet belongs. Since there are multiple flows and many channels in a typical system, one desires to minimize the hardware resources required to schedule packets for transmission.

SUMMARY

The problems identified above are in large part addressed by systems and methods disclosed herein for implementing a scheduler in a network processor. Embodiments comprise a memory to store schedule control blocks in a first, second, and third linked list. Each schedule control block is associated with a queue and comprises a rate limit and a counter. First, second, and third calendar entries are associated with the first, second, and third linked lists, respectively. Each calendar entry is adapted to store an address for a first-out schedule control block in the linked-list of schedule control blocks associated with the calendar entry. Embodiments further comprise control circuitry to increment a counter of a first-out schedule control block accessed from one of the first and second linked lists. The control circuitry moves the first-out schedule control block from the one linked list to the other of the first and second linked lists if the incremented counter is less than the rate limit. The control circuitry moves the first-out schedule control block from the one linked list to the third linked list if the incremented counter equals or exceeds the rate limit.

In one embodiment, a network processor for processing packets of data, comprises a data flow unit to receive packets of data, and for each packet, to determine a flow queue to which the packet belongs, and to transmit processed packets. The network processor also comprises an embedded processors complex comprising a plurality of processors to process packet data. A memory is provided to store schedule control blocks in a first, second, and third linked list, each schedule control block comprising a rate limit and a counter. First, second, and third calendar entries are associated with the first, second, and third linked lists, respectively. Each calendar entry is adapted to store an address for a first-out schedule control block in the linked-list of schedule control blocks associated with the calendar entry. Control circuitry increments a counter of a first-out schedule control block from one of the first or second linked lists. The scheduler moves the first-out schedule control block from the one linked list to the other of the first and second linked lists if the incremented counter is less than the rate limit, and moves the first-out schedule control block from the one linked list to the third linked list if the incremented counter equals or exceeds the rate limit.

Another embodiment is a method for scheduling packets of data in a network processor. The method comprises storing schedule control blocks in linked lists, each schedule control block associated with a queue and comprising a weight associated with a scheduling priority. Each schedule control block stored in the first linked list is sequentially accessed. Each schedule control block stored in the second linked list is also sequentially accessed. Each time a schedule control block is accessed, a scheduling event is generated to schedule a packet associated with the accessed schedule control block. The method further comprises incrementing a counter in a schedule control block each time a schedule control block is accessed from the first or second linked lists. Each time a schedule control block is accessed, the counter of the accessed schedule control block is compared to the rate limit assigned to the schedule control block. The schedule control block is transferred from one of the first and second linked lists to the other of the first and second linked list, if the compared counter value does not equal the rate limit assigned to the schedule control block. The schedule control block is transferred from one of the first and second linked lists to a third linked list and the counter of the schedule control block is reset, if the compared counter value equals or exceeds the rate limit assigned to the schedule control block.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for generating scheduling events for data packets in a network processor. Embodiments provide a network processor that comprises a best-effort scheduler with a minimal calendar structure for addressing schedule control blocks. In one embodiment, a three-entry calendar structure provides for rate-limited weighted best effort scheduling. Each of a plurality of packets is associated with a queue and each queue has an associated schedule control block. Schedule control blocks are stored as linked lists, with a different linked list associated with each calendar entry. The calendar entry associated with a linked list stores the address of the first schedule control block in the linked list. Each schedule control block has a counter and is assigned a rate limit according to the bandwidth priority of the flow to which the corresponding packet belongs. Each time a schedule control block is accessed from a last-in-first-out buffer storing the linked list, the scheduler generates a scheduling event and the counter of the schedule control block is incremented. When an incremented counter of a schedule control block equals its rate limit, the schedule control block is temporarily removed from further scheduling during a specified time interval, T.

Figure 1:
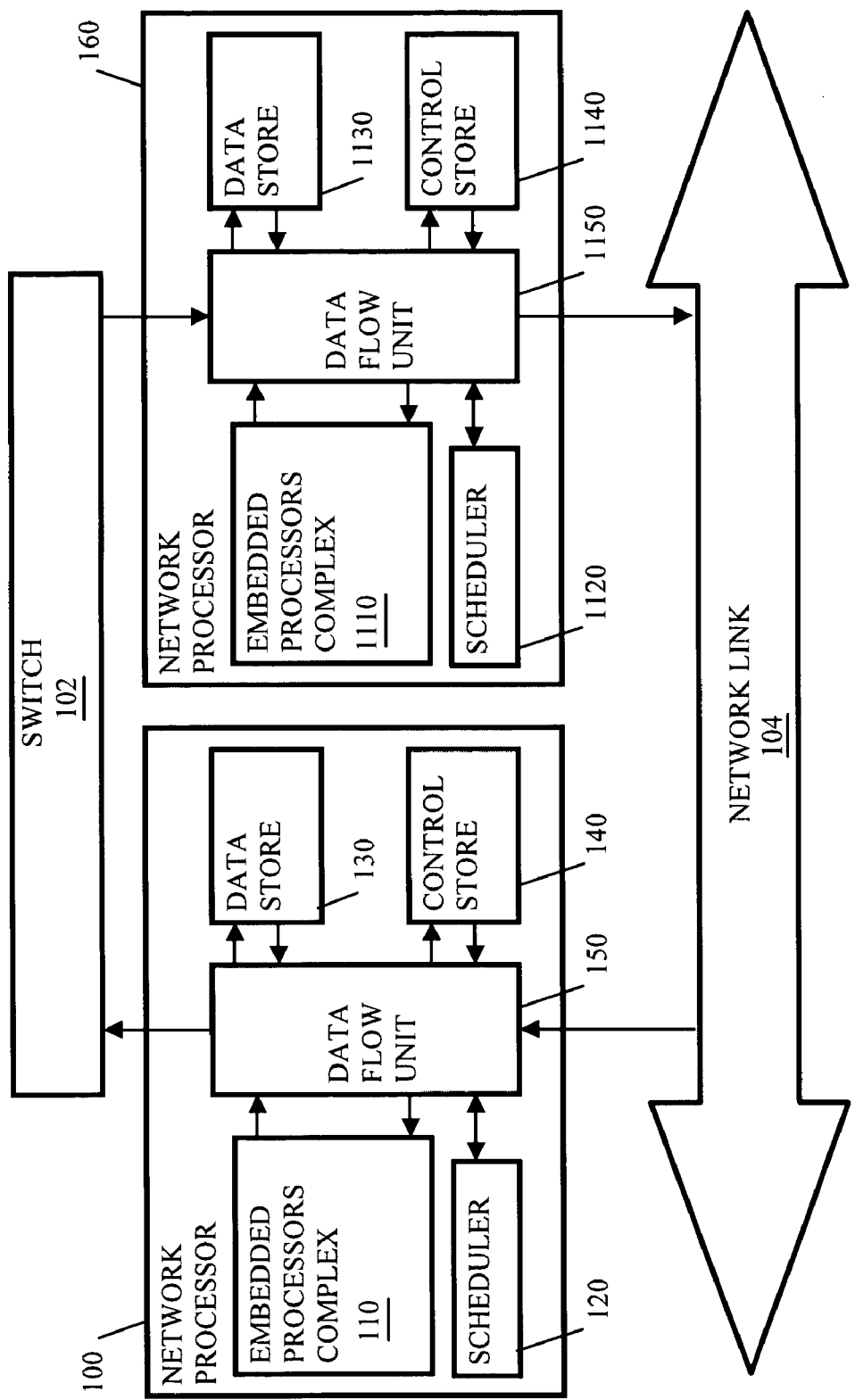
FIG. 1 depicts a plurality of network processors serving a network; each network processor comprising a data flow unit, and embedded processors complex, a scheduler, and control and data stores.

FIG. 1 shows an embodiment of a plurality of network processors 100 and 160 in a network. A network bus or full duplex network link 104 connected to computers, servers, other network processors, and other equipment in the network provides a stream of packets of data to a data flow unit 150 of network processor 100. Network processor 100 operates in an ingress mode to receive packets from network link 104 and transfer processed packets to a switch 102. Conversely, network processor 160 operates in an egress mode to receive packets from switch 102 and transfer processed packets to network link 104. Thus, a plurality of network processors may provide packets from the link to the switch (ingress) and a plurality of network processors may transfer packets from the switch to the link (egress). An overall purpose of the processors is to route information from a plurality of origination points in the network to a plurality of respective destination points in the network.

Data flow unit 150 receives packets of data from network link 104, and for each packet, forms a frame control block (FCB). Data flow unit 150 also writes each packet to a data store 130 implemented in DRAM. An FCB for a packet contains information about the packet. This information includes the size of the packet and where the packet is stored in data store 130. The FCB also contains a pointer to the next FCB in a chain of FCBs corresponding to one of a plurality of flow queues to which the packet belongs. Each FCB is stored in a control store 140 implemented in DRAM. Thus, the pointer to the next FCB points to an address of control store 140 where a next FCB in a chain is stored. The FCB provides a mechanism to keep track of a packet within the network processor and preserve an order in which it is received relative to other packets.

The network processor enqueues each FCB into one of a plurality of queues processed by an Embedded Processor Complex (EPC) 110. EPC 110 reads the frame pointer from the FCB and issues a read request to obtain frame data from the location in data store 130 pointed to by the frame pointer. EPC 110 processes the header of the frame in one of a plurality of pico-processors in EPC 110. Multiple pico-processors enable simultaneous processing of multiple flow queues. The pico-processors of EPC 110 perform network processing functions including filtering, classification and forwarding. During frame processing, EPC 110 can issue requests to a memory arbiter in data flow unit 150 to read and write parts of the frame from and to data store 130. Once EPC 110 processes the frame data, the processed frame data may be temporarily stored in data store 130.

When EPC 110 completes processing of a frame processing, EPC 110 passes the FCB to data flow unit 150. Data flow unit 150 enqueues the FCB into one of a plurality of flow queues of scheduler 120. Scheduler 120 selects the frame from a queue for transmission by passing the frame pointer of the FCB to the data flow unit. The frame pointed to by the frame pointer is read from data store 130 by data flow unit 150. Data flow unit 150 may modify the frame of packet data, and then transmit the modified packet out of the network processor. Thus, scheduler 120 is configured to schedule frames of data to be transmitted from network processor 100 to switch 102.

Similarly, network processor 160 provides an egress from the switch to the network. FIG. 1 shows elements of processor 160 corresponding to like-named, similarly-numbered elements of network processor 100. The description of the elements of network processor 100 applies to the like-named, similarly-numbered elements of network processor 160. Thus, network processor 160 comprises an EPC 1110, a scheduler 1120, a data store 1130, a control store 1140, and a data flow unit 1150. The data flow unit of network processor 160 receives packets from switch 102 and forms FCBs for the received packets as they are received. The packet data is stored in the data store and the FCBs are stored in the control store. The EPC processes the packets, and the scheduler schedules the processed packets for transmission to network link 104.

Figure 1A:
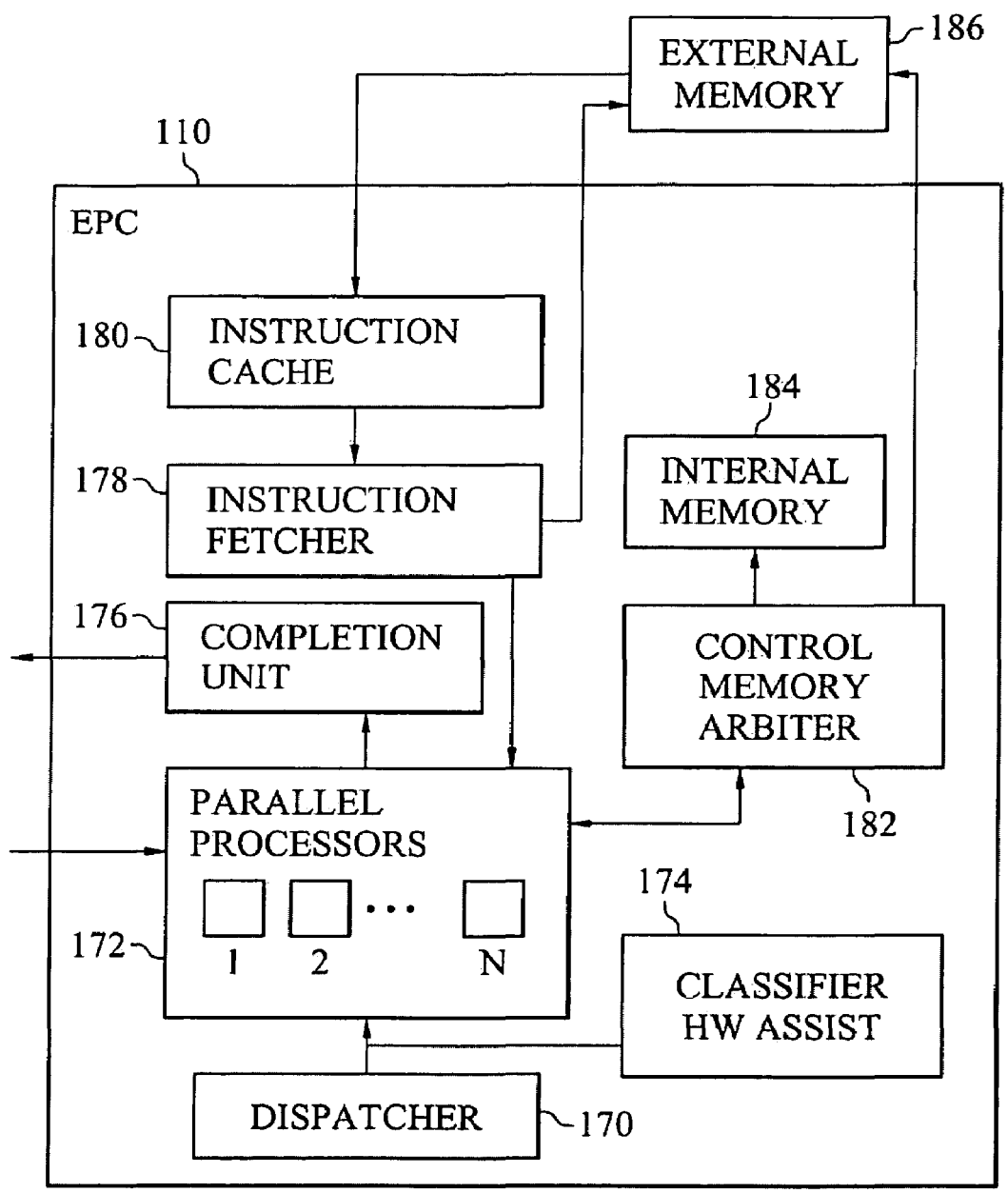
FIG. 1A depicts an embodiment of an embedded processor complex, with a plurality of processors operating in parallel to process packet data.

FIG. 1A shows a simplified block diagram of an Embedded Processors Complex EPC 110. EPC 110 receives frames from a data store and temporarily stores them before they are dispatched to an idle one of a plurality of parallel processors 172 by a dispatcher 170. When dispatcher 170 recognizes that a frame has been received by EPC 110, it finds one of the processors 172 that is available to receive frame data for processing. Processors 172 operate on different frames in parallel and dispatcher 170 attempts to keep as many processors busy processing frames as possible. Moreover, each processor of processors 172 is pipelined to enhance performance. For example, each processor may include a 3-stage pipeline (fetch, decode and execute). Processors 172 further comprise general purpose registers, special purpose registers, a dedicated arithmetic logic unit (ALU) and coprocessors. Further, a processor may comprise a primary data buffer, a scratch pad data buffer and control registers for data store operations.

Concurrently with dispatching a frame to one of processors 172, a classifier hardware assist 174 identifies the type of message format and identifies key information about the packet such as starting address, and header location. Processors 172 receive instructions from an on-chip instruction cache 180. Instruction cache 180 receives instructions from a memory 186 external to EPC 110 such as a system memory implemented in Random Access Memory (RAM). Ideally, instructions that are executed over and over again—i.e., steady state code—are kept in the instruction cache, to minimize long latency external memory reads.

Thus, EPC 110 may comprise an instruction fetcher 178 to initiate a transfer of instructions from external memory 186 to I-cache 180. The place in the cache to where an instruction is transferred from external memory 186 is determined by an index determined from the external memory address of the instruction. The index is the address of a cache entry. With each instruction stored in the cache, a tag determined from the external memory address is also stored. The tag identifies the instruction stored at the cache entry. In an n-way associative cache, there are n locations to store an instruction within a cache entry. To determine which one of the n-locations stores the instruction called for by the program counter of the instruction fetcher, a tag comparator within the instruction fetcher compares the tag from the program counter to the tag of each instruction at the cache entry until the correct instruction is found.

Each frame received by EPC 110 has identifying information such as a message number, a source address, and a destination address. The location and content of this information in a header of the frame data depends on the packet format. A processor must determine the identifying information in the frame, and determine the routing requirements of the packet. The frame header information allows the network processor to properly route the frame with other processed frames so that a completed message is received at an intended destination. Frames that have common identifying information form a "flow" and processors 172 simultaneously process a plurality of flows.

Processors 172 can also performing filtering of packets, enforcing hundreds or more frame filter rules with complex range and action specifications. For example, filter rules can deny or permit a frame or allocate quality of service (QoS) based on IP header information. Filtering is essential for network security, and hardware assist 174 provides wirespeed enforcement of these complex rule sets.

Processors 172 send processed packets to a completion unit 176. While maintaining frame sequence, completion unit 176 passes processed frames to data flow unit 150. EPC 110 further comprises a control memory arbiter 182 to arbitrate requests for control memory by processors 172. Control memory may comprise internal memory 184 and external memory 186. Control memory stores tables, counters, and other data used by processors 172.

Figure 2:
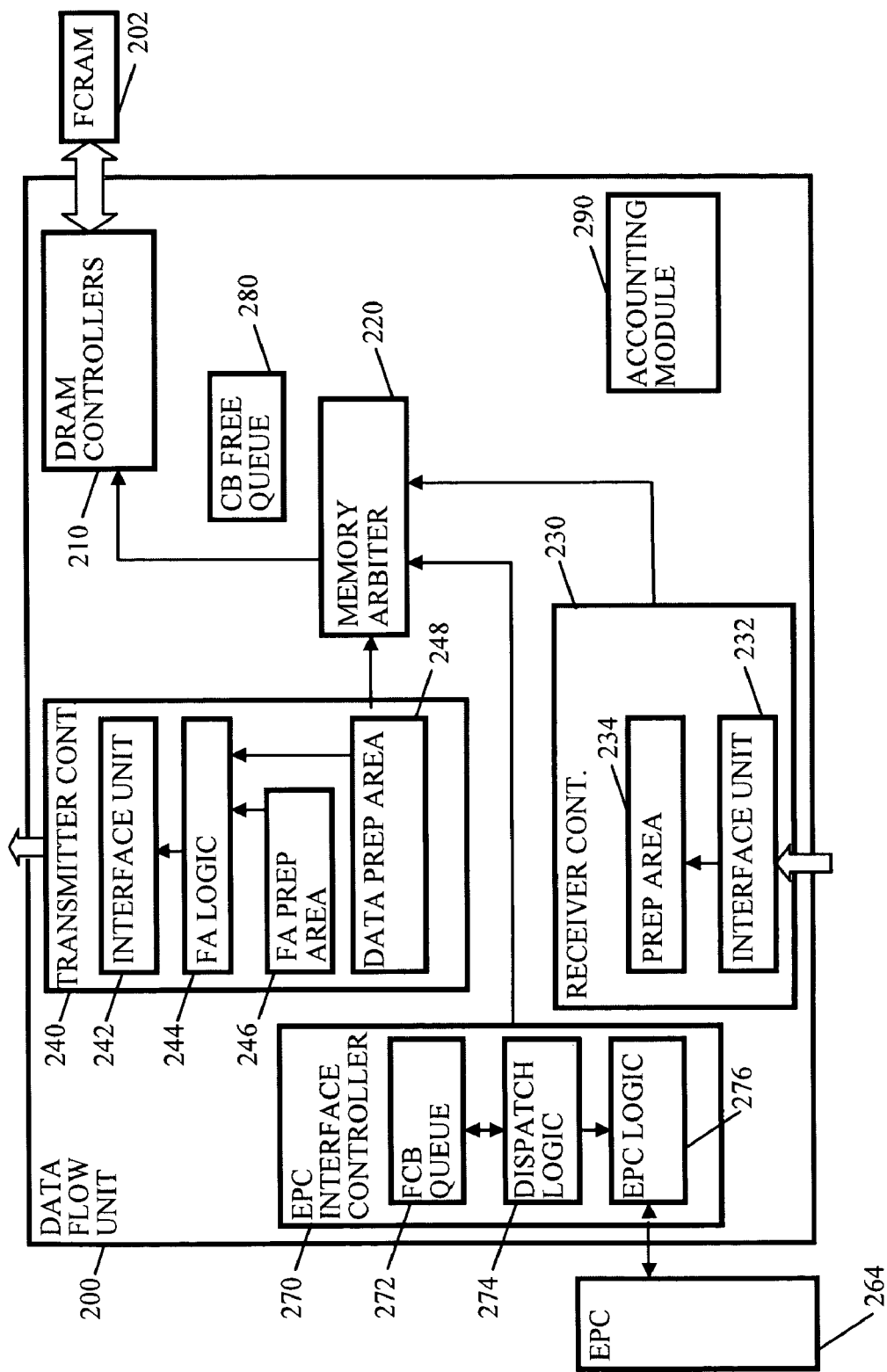
FIG. 2 depicts an embodiment of a data flow unit comprising a receiver controller, a transmitter controller, and an EPC interface controller.

FIG. 2 shows a block diagram of an embodiment of a data flow unit 200 and memory system 202. Memory system 202 is implemented in a type of DRAM called Fast Cycle RAM (FCRAM). The FCRAM forming memory system 202 can be divided into a data store for storing frame data and a control store for storing FCBs. Moreover, memory system 202 can be organized into slices. Each slice comprises a plurality of buffers to store frames of packet data in the data store or FCBs in the control store. DRAM controllers 210 control the reading of data from the FCRAM 202 and the writing of data to FCRAM 202. In one embodiment, DRAM controllers 210 control the transfer of 16 bytes per read or write request.

A memory arbiter 220 interfaces the data flow chip to memory system 202. Memory arbiter 220 receives write requests from a receiver controller 230 to write packet data to a data store of memory system 202 and to write FCBs to a control store of memory system 202. Memory arbiter 220 receives read requests from a transmitter controller 240 to read FCBs from the control store and to read packet data from the data store. Memory arbiter 220 also receives read and write requests from an EPC interface controller 270. EPC Interface controller 270 controls transfers of FCBs and packet data from memory system 202 to an embedded processors complex, EPC 264. EPC interface controller 270 also controls transfer of FCBs from EPC 264 to transmitter controller 240 and controls transfers of processed packet data to system memory 202.

Memory arbiter 220 receives the read and write requests from EPC interface controller 270, receiver controller 230, and transmitter controller 240, and schedules access to memory system 202. Frame data is written to different buffers distributed over different memory slices to make good use of memory bandwidth. In one embodiment, data is read from the FCRAM in 16-byte increments, with each buffer in a slice having 16 bytes. Similarly, data is written in 16 byte increments.

Receiver controller 230 receives and temporarily stores data from a link or switch. In an ingress mode, receiver controller 230 receives packet data from a network link. In an egress mode, receiver controller 230 receives packet data from a switch. Receiver controller 230 receives packets through an interface unit 232. Interface unit 232 is adaptable to receive packet data from a switch or a link. When a packet is received from interface unit 232, it is first stored in a preparation area 234, while a frame control block is obtained for the packet. As packets are received, receiver controller 230 issues write requests to memory arbiter 220 to write received packet data into individual buffers of a data store segment of memory system 202. Receiver controller 230 also issues write requests to write FCBs to the control store.

Receiver controller 230 temporarily stores packets received from interface unit 232 in a preparation area memory 234 prior to storing the packet data in a data store of memory system 202. While data is temporarily stored in preparation area 234, receiver controller 230 may dequeue FCBs from a Control Block (CB) free queue 280. CB free queue 280 may store convenient number of FCBs not associated with any packet and provides a store of available FCBs to associate with packets as they are received. CB free queue 280 may be organized into frame control blocks and groups of frame control blocks may be organized into a Table Control Block (TCB). Each available FCB obtained from CB free queue 280 has a pointer to the address of the next free FCB in the free queue. When a packet is transmitted, its FCB is returned to CB free queue 280.

Each FCB includes a frame pointer that points to a memory location in the data store where the frame of packet data corresponding to the FCB is stored. Upon obtaining the FCB, receiver controller 230 issues a write request and transfers the packet to memory system 202 at the location determined by the frame pointer of the FCB. A copy of the FCB is stored in a control store of memory system 202. Each FCB in the control store contains a pointer to the control store location that contains the next FCB in the queue to form a chain of linked frame control blocks.

EPC Interface controller 270 comprises dispatch logic 274 to de-queue FCBs from a local FCB queue 272 which receives FCBs from the control store in memory system 202. Once dispatcher logic unit 274 dequeues the next FCB from FCB queue 272, dispatcher logic unit 274 issues a read request to memory arbiter 220 to obtain the frame header data of the packet. Thus, EPC 264 reads the frame pointer in the FCB and retrieves the frame header from the data store of memory system 202 at the location pointed to by the frame pointer. EPC 264 processes the frame header and issues a write request to memory arbiter 220 to write the processed frame data to the data store in memory system 202. Once EPC 264 processes the frame data, an EPC logic unit 276 issues the FCB associated with the processed frame to scheduler 120 or 1120.

Transmitter controller 240 comprises a data preparation area 248, a frame alteration command preparation area 246, frame alteration (FA) logic 244, and an interface unit 242. Data preparation area 248 comprises a relatively small amount of memory to store frame data prior to transmission to a switch or data link port by way of interface unit 242. Frame alteration command preparation area 246 receives commands from EPC 264 to effect modification of a frame. Frame alteration logic 244 receives a frame of data from data preparation area 248 and applies it to logic circuitry operating under the control of commands from FA preparation area 246. Thus, data flow unit 200 de-queues an FCB and reads the frame pointer. Data preparation area memory 248 receives the data from the data store location of memory system 202 that is pointed to by the dequeued FCB. Frame modification commands from EPC 264 are received by FA preparation area 246. These commands control FA logic 244 to alter the frame data before it is passed to interface unit 242.

Data Flow unit 200 further comprises an accounting module 290 to perform basic accounting functions. For example accounting 290 may count packets received, processed and transmitted in each of a plurality of flow queues. Each time accounting module 290 performs a count of a packet, an appropriate counter value must be read from a memory, incremented, and written back to the memory. Since there may be a very large number, perhaps, over a million, flow queues, accounting module 290 must implement a very large number of counters. Consequently, a very large number of counter values must be stored in a memory. Moreover, each counter value memory location may be 32 bits wide. For this reason, memory storage of these counter values in DRAM or other cost effective memory is desirable.

Figure 3:
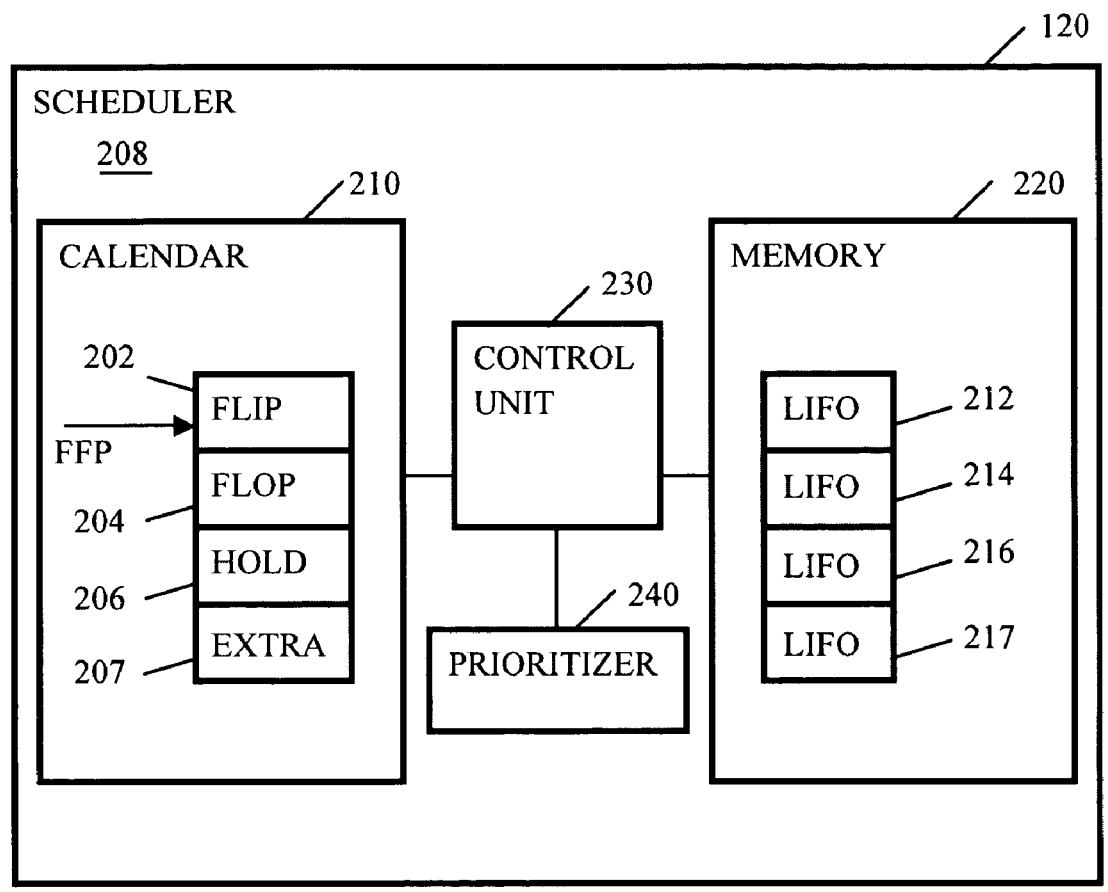
FIG. 3 depicts an embodiment of a calendar and LIFO buffers in a weighted best effort scheduler.

FIG. 3 shows a functional block diagram of one embodiment of a scheduler 120. Scheduler 120 comprises a four-entry calendar 210 for each channel or port (only one shown in FIG. 3). Scheduler 120 also comprises a memory 220 for storing schedule control blocks, and a control unit 230 to control operation of the scheduler. Scheduler 120 further comprises a prioritizer 240, which writes a numerical weight and a rate limit to each schedule control block (SCB) according to the priority of the flow with which the SCB is associated. The calendar entries are labeled Flip 202, Flop 204, Hold 206 and Extra 207. A Flip-Flop Pointer (FFP) 208 points to the current calendar entry being processed. Each calendar entry stores an address of an SCB. Each calendar entry is associated with a Last-In-First-Out (LIFO) buffer 212, 214, 216, and 217, respectively. The SCB address in a calendar entry points to the first-out SCB in the LIFO buffer associated with the calendar entry. Each SCB has a pointer to the next SCB in the LIFO buffer. Thus, the memory provides storage of a linked-list of schedule control blocks associated with each calendar entry.

Each SCB also contains a pointer to a corresponding Queue Control Block (QCB). Each QCB corresponds to a flow. Thus, when an SCB address is read from the calendar entry, the scheduler identifies the QCB associated with the SCB. The QCB contains a head pointer that points to the head packet corresponding to the flow. The head packet, thus identified, may then be dequeued for transmission.

Figure 4:
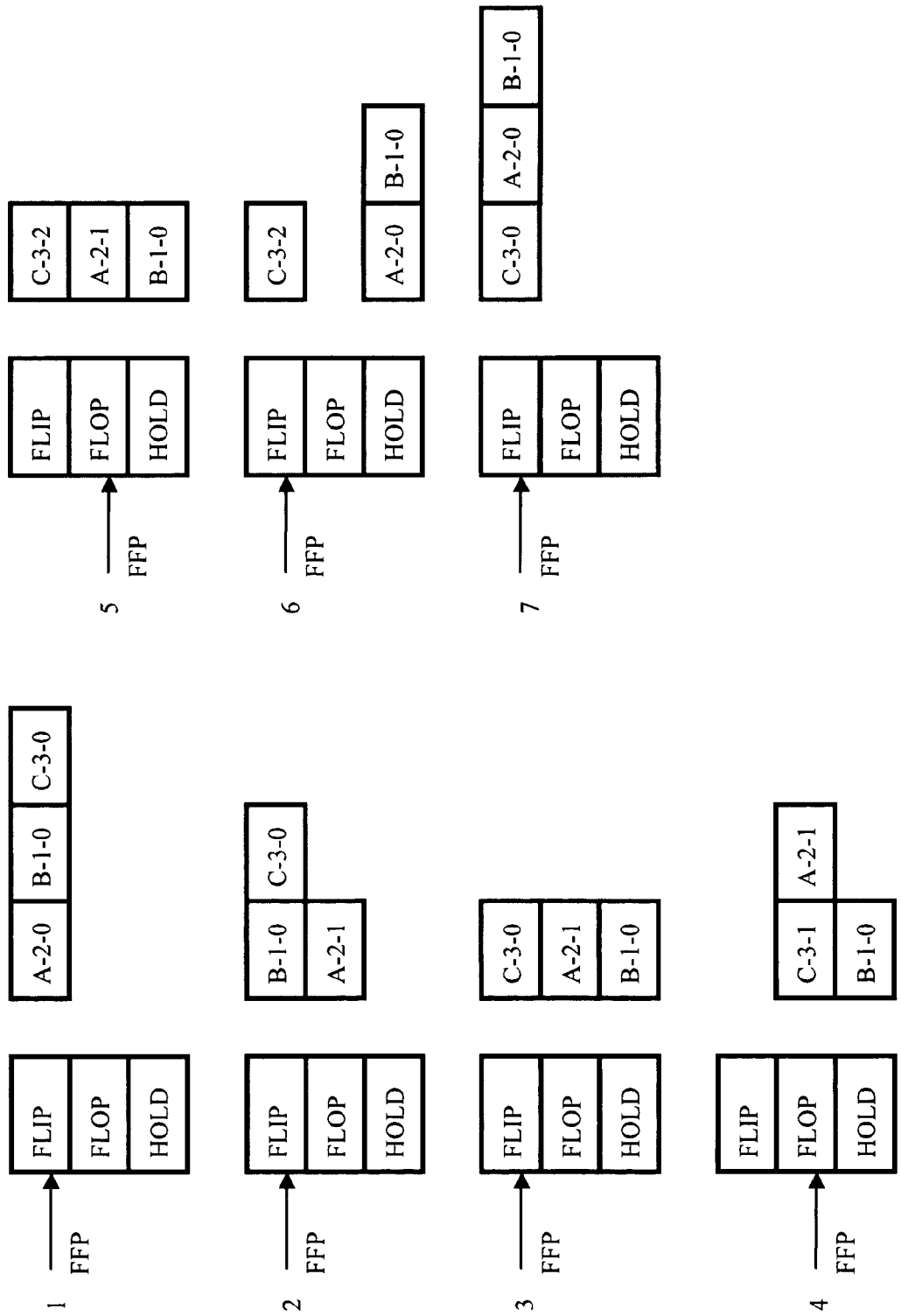
FIG. 4 depicts an example of scheduling with a three-entry calendar.

Operation of scheduler 120 may be more clearly understood by reference to a hypothetical sequence of SCBs. FIG. 4 shows an example of seven stages of a process of weighted scheduling of packets for transmission. In each stage, for clarity, the Extra calendar entry is not shown. In stage 1, a sequence of SCBs, each one corresponding to a different flow queue A, B, or C, is stored in a LIFO buffer associated with the Flip calendar entry. Each SCB has a weight associated with an allocation of bandwidth for the queue. In this example, SCB A has a weight of 2, SCB B has a weight of 1, and SCB C has a weight of 3. The value of the weight assigned to a flow queue determines a number of times an SCB belonging to that flow queue will be scheduled in a scheduling cycle. Each SCB also comprises a counter to be incremented when a packet corresponding to the SCB is scheduled. In stage 1, each counter begins at zero. Thus, each schedule control block is associated with a weight and comprises a counter. The weight may be stored in the schedule control block or may be derived from a number stored in the schedule control block. As will be discussed, when the incremented counter value equals or exceeds a weight associated with the schedule control block, the schedule control block is withdrawn from further scheduling during the current scheduling cycle.

In stage 1, the FFP points to the Flip calendar entry. Control unit 230 reads the address of SCB A in flip entry 202. Control unit 230 retrieves the SCB from LIFO buffer 212 of memory 220. Control unit 230 obtains the QCB pointed to by the SCB. Control unit 230 then obtains the head pointer from the QCB to identify and schedule for transmission the head packet corresponding to SCB A. When the packet is scheduled for transmission, control unit 230 increments the counter in SCB A. Control unit 230 then compares the counter value to the weight of the flow contained in the SCB. Since the counter value is less than the weight, (i.e., 1<2), control unit 230 pushes SCB A into the LIFO buffer associated with the Flop calendar entry. Control unit 230 pushed an SCB into a LIFO buffer by writing the SCB address to the calendar entry corresponding to the LIFO buffer, and writing to that SCB a pointer to the formerly first-out SCB in the LIFO buffer.

In stage 2, control unit 230 reads SCB B and schedules its corresponding packet for transmission. Since flow queue B has a weight of 1, and one transmission of a B packet has now occurred, control unit 230 pushes SCB B into the LIFO buffer associated with the Hold calendar entry. As will be seen, this withdraws the SCB from further scheduling during the current scheduling cycle.

In stage 3, control unit 230 obtains SCB C and schedules its corresponding packet for transmission. Control unit 230 increments the counter of SCB C and compares the counter value to the weight of the SCB. Since the counter value is less than the weight, control unit 230 pushes SCB C into the LIFO buffer associated with the Flop calendar entry.

In stage 4, the LIFO associated with the Flip calendar entry is now empty. Consequently, the FFP now points to the Flop calendar entry for scheduling of SCBs in the LIFO buffer associated with the Flop calendar entry. Thus, in stage 4, control unit 230 schedules a packet corresponding to SCB C for transmission. Control unit 230 increments the counter of SCB 3 and compares the counter value to the weight of flow C. Since counter does not equal the weight assigned to the flow, which for SCB C is 3, control unit 230 pushes SCB C into the LIFO buffer associated with the Flip calendar entry.

In stage 5, control unit 230 schedules the next packet associated with SCB A for transmission. Control unit 230 increments the counter of SCB A and compares the counter value to the weight of flow A. Since the counter value now equals the weight assigned to SCB A, the counter is reset to zero, and control unit 230 pushes SCB A into the LIFO buffer associated with the Hold calendar entry. In stage 6, the LIFO buffer associated with the Flop calendar entry is empty, so the Flip-Flop Pointer (FFP) now points to the Flip calendar entry. Consequently, control unit 230 schedules the next packet associated with SCB C for transmission. Control unit 230 increments the counter of SCB C and compares the counter value to the weight of flow C. Since the counter value now equals the weight assigned to SCB C, the counter is reset to zero, and control unit 230 pushes SCB C into the LIFO buffer associated with the Hold calendar entry. This LIFO entry is then associated with the Flip entry of the calendar and a new scheduling cycle begins as shown in stage 7 of FIG. 4.

Note that the pattern of scheduling depicted in FIG. 4 is ABCCAC: an A-packet is scheduled twice, a B-packet is scheduled once, and a C-packet is scheduled three times. Thus, each flow is scheduled according to its weight. Note also that the scheduler can be implemented to generate scheduling events for a minimal quantity of packet data, such as 64 bytes. Then, a frame of 640 bytes would be transmitted after 10 scheduling events for the flow queue to which the frame belongs. Scheduling events are counted by a counter in the QCB corresponding to the flow queue. The value of the counter is compared to the number of scheduling events called for to transmit a frame. A frame is transmitted when the compared values are equal. Also note that although only three SCBs were used in the example described above, the three-calendar scheduler can operate according to the illustrated principles on any number of SCBs. Finally, in the embodiments described above, the counter is incremented successively each time its SCB is scheduled, from zero to the weight value. In alternative embodiments, the counter is decremented successively each time its SCB is scheduled, from the weight value to zero. Then when the SCB is pushed into the Hold LIFO buffer, the counter is reset to the weight value.

Figure 5:
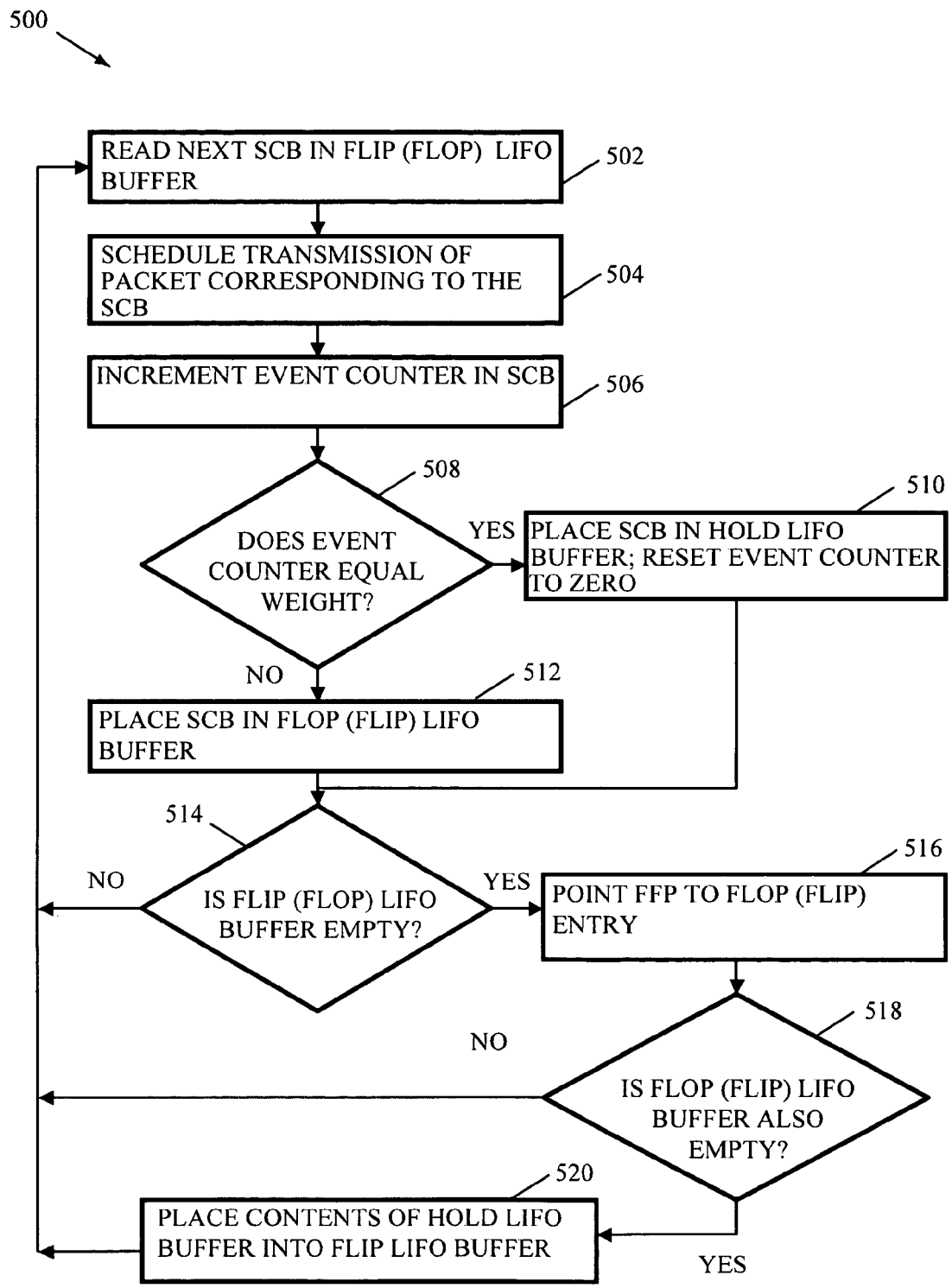
FIG. 5 depicts a flow chart of an embodiment for scheduling with a three-entry calendar.

FIG. 5 shows a flow chart 500 of an embodiment for scheduling packets. A scheduler of a network processor reads an SCB in the Flip LIFO buffer of the scheduler at the address provided by the Flip calendar entry (element 502). In another step, the scheduler schedules an event for a packet corresponding to the SCB (element 504). The scheduler then increments the event counter of the SCB (element 506). The scheduler then compares the event counter to the weight assigned to the flow (element 508). If the event counter is equal to the weight, then the scheduler pushes the SCB into the LIFO buffer associated with the Hold calendar entry (element 510). If the event counter is not equal to the weight, then the scheduler puts the SCB into the LIFO buffer associated with the Flop calendar entry. After transmission is scheduled and the SCB is moved to either the Hold LIFO buffer (element 510) or the Flop LIFO buffer (element 512), the scheduler then determines if the Flip LIFO buffer is empty (element 514).

If the Flip LIFO buffer is not empty, the scheduler reads the next SCB from the Flip LIFO buffer (element 502). If the Flip LIFO buffer is empty, the scheduler moves the Flip-Flop Pointer to point to the Flop calendar entry (element 516). The scheduler then determines if the Flop LIFO buffer is empty (element 518). If the Flop LIFO buffer is not empty, the scheduler reads the next SCB from the Flop LIFO buffer (element 502). If the Flop LIFO is empty, the scheduler pushes the contents of the Hold LIFO buffer into the Flip LIFO buffer (element 520). Then, the scheduler reads the next SCB from the Flip LIFO buffer (element 502).

Thus, a first last-in-first-out (LIFO) buffer is associated with a first calendar entry. The first calendar entry has an address of the schedule control block (SCB) most recently added to the first LIFO buffer. Each SCB in the first LIFO buffer contains a pointer to the next SCB in the first LIFO buffer. Each SCB also contains a pointer to a corresponding queue control block (QCB). A QCB contains a pointer to the head packet in the queue. When the scheduler accesses an SCB from the first LIFO buffer, the packet pointed to by the QCB corresponding to the SCB is scheduled for transmission. The scheduler then places the SCB in a second LIFO buffer associated with a second calendar entry or places the SCB in a third LIFO buffer associated with a third calendar entry. The second LIFO buffer holds SCBs to be scheduled in a scheduling cycle. The third LIFO buffer holds SCBs to be withdrawn from further scheduling for the present scheduling cycle.

In a scheduling cycle, the scheduler successively schedules SCBs from the first LIFO buffer. This continues until all of the SCBs in the first LIFO buffer are scheduled. Each time the scheduler accesses an SCB from the first LIFO buffer, the scheduler increments a counter in the SCB. Then, if the counter is less than the weight assigned to the SCB, the scheduler pushes the SCB into the second LIFO buffer. If, however, the counter equals the weight assigned to the SCB, the scheduler pushes the SCB into the third LIFO buffer, thereby withdrawing the SCB from further scheduling during the scheduling cycle. In the same scheduling cycle, once all of the SCBs in the first LIFO buffer are scheduled, the scheduler then successively schedules each SCB in the second LIFO buffer. Each time the scheduler accesses an SCB from the second LIFO buffer, the scheduler increments a counter in the SCB. Then, if the counter is less than the weight assigned to the SCB, the scheduler pushes the SCB back into the first LIFO buffer. If however, the counter equals the weight assigned to the SCB, the scheduler pushes the SCB into the third LIFO buffer, thereby withdrawing the SCB from further scheduling during the scheduling cycle. Once all the SCBs in the second LIFO buffer are scheduled, the third LIFO buffer now becomes the first LIFO buffer, and a new scheduling cycle begins. This is done by writing the address of the first-out SCB of the third LIFO buffer into the first calendar entry corresponding to the first LIFO buffer.

In the addition to weighted scheduling as described above, or in the alternative, embodiments are rate-limited. In rate limiting, a maximum number of scheduling events for a queue in a given interval of time is imposed, as will now be described with reference to FIG. 6. Each SCB has a Limit, L, which specifies the number of times the SCB can be scheduled in a specified time interval of duration T. The limit, L, assigned to an SCB is determined according to the priority of the associated queue of the SCB. Each SCB has a counter associated with the rate limit of the SCB. At a beginning of a time interval, T, a rate limit counter of the SCB is set to the rate limit, L, assigned to the SCB. Each time an SCB is scheduled, the rate limit counter is decremented by 1. When the decremented rate limit counter is zero, the SCB is placed in the LIFO buffer associated with the Extra calendar entry, and is thereby withdrawn from further scheduling during a scheduling cycle or at least during the remainder of the time interval, T. At the end of the time interval T, the SCBs in the LIFO buffer associated with the Extra calendar entry are pushed into the LIFO buffer associated with the Hold calendar entry. In an alternative embodiment the SCBs in the Extra buffer may be pushed into the Flip or Flop buffer.

Figure 6:
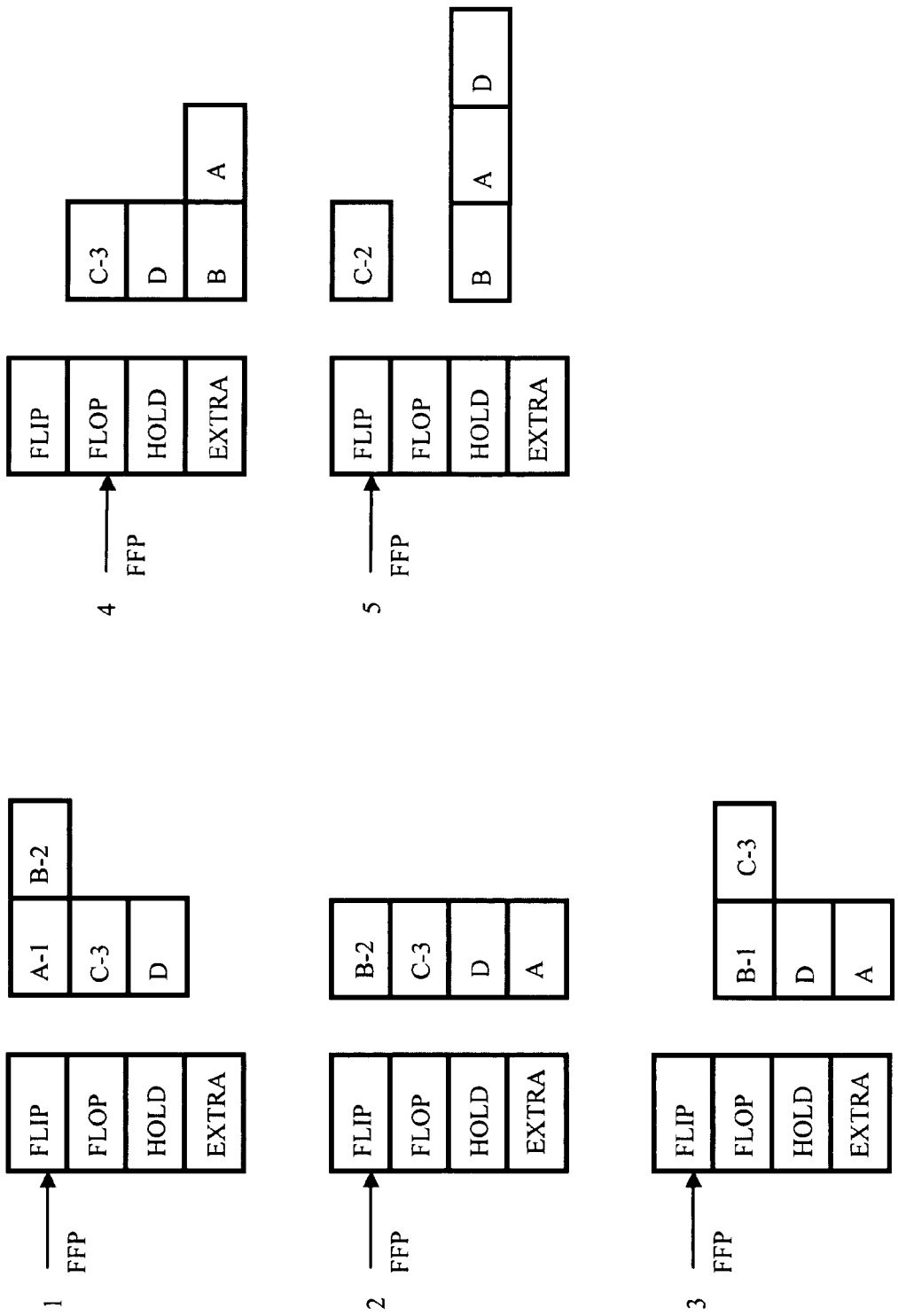
FIG. 6 depicts an example of scheduling with a four-entry calendar.

Use of the fourth calendar entry, denoted Extra, and the fourth LIFO buffer may be more clearly understood by reference to the example depicted in FIG. 6. FIG. 6 shows 5 stages of operation of the four entry calendar system. At a time, t, two SCBs, A and B, are in the Flip LIFO buffer. SCB C is in the Flop LIFO buffer and SCB D is in the Hold LIFO buffer. Each SCB has a rate limit that indicates the maximum number of times the SCB can be scheduled in a time interval. At the beginning of a time interval, T, each SCB has a counter that starts at the rate limit of the SCB and decrements by one each time the SCB is scheduled, until the counter reaches zero.

As shown in stage 1, at a time, t, during the time interval, T, the rate limit counter of SCB A is 1, the rate limit counter of SCB B is 2, and the rate limit counter of SCB C is 3. In stage 1, the FFP points to the Flip calendar entry. Consequently, a scheduling event occurs for SCB A in stage 1. The rate limit counter of SCB A is decremented by 1. In stage 2, SCB A has been moved to the LIFO Buffer associated with the Extra calendar entry since its rate limit counter reached zero. The rate limit counter is now reset to the rate limit. A scheduling event now occurs for SCB B, and its rate limit counter is then decremented by 1. In stage 3, SCB B has been moved to the Flop LIFO buffer and the FFP now points to the Flop calendar entry since the Flip LIFO buffer is empty. A scheduling event now occurs for SCB B, and the rate limit counter of SCB B is decremented by 1. In stage 4, SCB B is pushed into the Extra LIFO buffer, and its rate limit counter is reset to the rate limit. Note that in an alternative equivalent embodiment, the counter may start at zero and be incremented each time a scheduling event occurs until the counter equals the rate limit. Then, the SCB is pushed into the Extra LIFO buffer, and its rate limit counter is reset to zero.

The configuration of stage 5 shows the condition when the time interval T concludes. SCBs A and B have been moved from the Extra LIFO buffer to the Hold LIFO buffer. At the end of the current scheduling cycle, when both the Flip and Flop LIFO buffers are empty, the contents of the Hold LIFO buffer are moved to the Flip LIFO buffer. To push SCBs A and B into the Hold LIFO buffer, SCB A must be linked to SCB D. This is done by writing the pointer to D into SCB A. This in turn means that the Extra calendar entry should store the address of the last SCB in its LIFO buffer, as well as the address of the first SCB. In an alternative configuration, when the time interval T concludes, the SCBs in the Extra LIFO buffer could be moved to the Flip LIFO buffer or to the Flop LIFO buffer, rather than to the Hold LIFO buffer.

Figure 7:
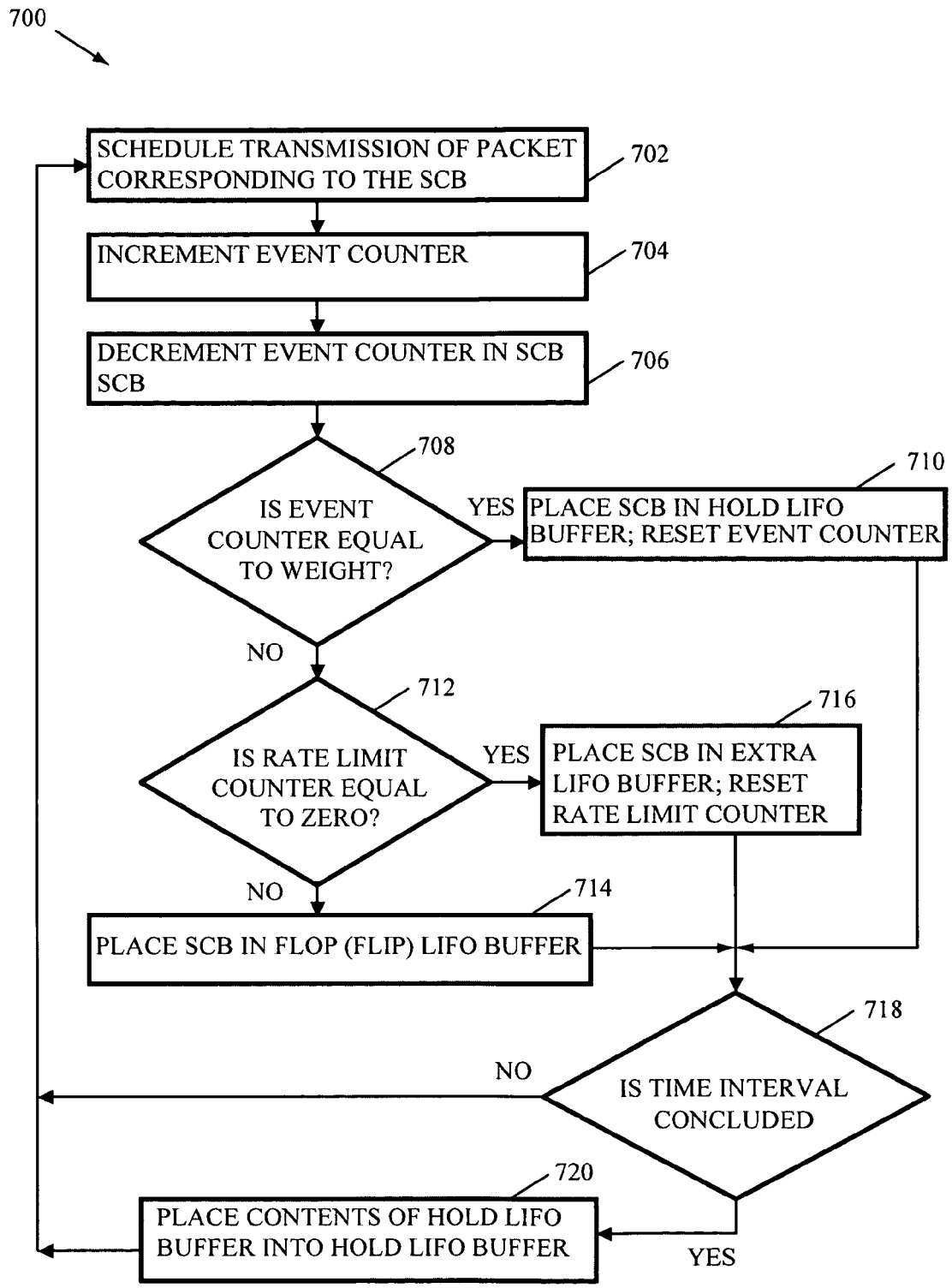
FIG. 7 depicts a flow chart of an embodiment for scheduling with a four-entry calendar.

FIG. 7 shows a flow chart 700 of one embodiment for rate-limited, weighted best effort scheduling. When an SCB is scheduled (element 702), an event counter of the SCB is incremented (element 704) and a rate limit counter of the SCB is decremented (element 706). If the event counter is equal to the assigned weight of the SCB, (element 708), the SCB is placed in the Hold LIFO buffer and the event counter is reset (element 710). If the event counter is less than the weight (element 708), then the system determines if the rate limit counter is equal to zero (element 712). If the rate limit counter is equal to zero, (element 712), the SCB is placed in the Extra LIFO buffer and the rate limit counter is reset (element 716). If the rate limit counter is not equal to zero (element 712), then the SCB is transferred from the Flip (Flop) LIFO buffer to the Flop (Flip) LIFO buffer (element 714). If the time interval, T, has not concluded (element 718), another SCB is scheduled (element 702). Otherwise, the contents of the Extra LIFO buffer are placed in the Hold LIFO buffer (element 720), and scheduling continues (element 702).

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A scheduler in a network processor, comprising:
    memory to store schedule control blocks in a first, second, and third linked list of schedule control blocks, each schedule control block associated with a queue and a rate limit and comprising a counter;
    first, second, and third calendar entries associated with the first, second, and third linked lists, respectively, each calendar entry adapted to store an address for a first-out schedule control block in the linked-list of schedule control blocks associated with the calendar entry; and
    control circuitry to decrement a counter of a first-out schedule control block from one of the first and second linked lists; and to move the first-out schedule control block from the one linked list to the other of the first and second linked lists if the decremented counter is greater than a rate limit of the first-out schedule control block during a specified time interval, and to move the first-out schedule control block from the one linked list to the third linked list if the decremented counter equals or is less than the rate limit during the specified time interval.

2. The scheduler of claim 1, wherein the control circuitry further comprises a pointer to alternately point to the first and second calendar entries, the pointer continually pointing to one of the first or second calendar entries until all schedule control blocks in the linked list associated with the entry have been successively accessed from the memory.

3. The scheduler of claim 2, wherein the control circuitry further comprises a prioritizer for assigning a rate limit to a schedule control block.

4. The scheduler of claim 2, wherein the control circuitry further comprises a mechanism for reading a queue control block corresponding to a schedule control block to determine a head packet to be scheduled for transmission.

5. The scheduler of claim 4, further comprising a counter to count the number of times a queue control block is accessed.

6. The scheduler of claim 1, further comprising control circuitry to increment a counter of a first-out schedule control block from one of the first and second linked lists; and to move the first-out schedule control block from the one linked list to the other of the first and second linked lists if the incremented counter is less than a weight of the first-out schedule control block, and to move the first-out schedule control block from the one linked list to a fourth linked list if the incremented counter equals or is greater than the weight.

7. The scheduler of claim 1, wherein the control circuitry further comprises a mechanism for reading a queue control block corresponding to a schedule control block to determine a head packet to be scheduled for transmission.

8. The scheduler of claim 7, further comprising a counter to count the number of times a queue control block is accessed.

9. A network processor for processing packets of data, comprising:
    a data flow unit to receive packets of data, and for each packet, to determine a flow queue to which the packet belongs, and to transmit processed packets;
    an embedded processors complex comprising a plurality of processors to process packet data;
    a memory to store schedule control blocks in a first, second, and third linked list, each schedule control block associated with a rate limit and comprising a counter;
    first, second, and third calendar entries associated with the first, second, and third linked lists, respectively, each calendar entry adapted to store an address for a first-out schedule control block in the linked-list of schedule control blocks associated with the calendar entry; and
    control circuitry to increment a counter of a first-out schedule control block from one of the first or second linked lists; and to move the first-out schedule control block from the one linked list to the other of the first and second linked lists if the incremented counter is less than the rate limit in a specified time interval, and to move the first-out schedule control block from the one linked list to the third linked list if the incremented counter equals or exceeds the rate limit in the specified time interval.

10. The network processor of claim 9, wherein the control circuitry further comprises a pointer to alternately point to the first and second calendar entries, the pointer continually pointing to one of the first or second calendar entries until all schedule control blocks in the linked list associated with the entry have been successively accessed from the memory.

11. The network processor of claim 10, wherein the control circuitry further comprises a prioritizer for assigning a rate limit to a schedule control block.

12. The network processor of claim 10, wherein the control circuitry further comprises a mechanism for reading a queue control block corresponding to a schedule control block to determine a head packet to be scheduled for transmission.

13. The network processor of claim 12, further comprising a counter to count the number of times a queue control block is accessed.

14. The network processor of claim 9, wherein the control circuitry further comprises a prioritizer for assigning a rate limit to a schedule control block.

15. The network processor of claim 9, wherein the control circuitry further comprises a mechanism for reading a queue control block corresponding to a schedule control block to determine a head packet to be scheduled for transmission.

16. The network processor of claim 9, further comprising control circuitry to increment a counter of a first-out schedule control block from one of the first and second linked lists; and to move the first-out schedule control block from the one linked list to the other of the first and second linked lists if the incremented counter is less than a weight of the first-out schedule control block, and to move the first-out schedule control block from the one linked list to a fourth linked list if the incremented counter equals or is greater than the weight.

17. A method for scheduling packets of data in a network processor, comprising:
    storing schedule control blocks in linked lists, each schedule control block associated with a queue and assigned a rate limit associated with a scheduling priority for the queue;
    sequentially accessing each schedule control block stored in a first linked list;
    sequentially accessing each schedule control block stored in a second linked list;

generating a scheduling event for the packet corresponding to an accessed schedule control block for each schedule control block accessed from the first or second linked list;

incrementing a counter in a schedule control block each time a schedule control block is accessed from the first or second linked lists;

comparing the counter of the accessed schedule control block each time a schedule control block is accessed to a rate limit assigned to the schedule control block;

transferring a schedule control block from one of the first and second linked lists to the other of the first and second linked list, if the compared counter value is less than the rate limit assigned to the schedule control block in a specified time interval; and transferring a schedule control block from one of the first and second linked lists to a third linked list and resetting the counter of the schedule control block, if the compared counter value equals or exceeds the rate limit assigned to the schedule control block in the specified time interval.

18. The method of claim 17, further comprising transferring the address of a first-out schedule control block of the third linked list to a calendar entry corresponding to the first linked list if both the first and second linked lists are empty.

19. The method of claim 17, further comprising accessing a queue control block corresponding to a schedule control block to determine a head packet to be scheduled for transmission.

20. The method of claim 19, further comprising a counter to count the number of times a queue control block is accessed.

* * * * *